D. BASCH.
SYSTEM FOR THE TRANSFORMATION OF ELECTRICAL ENERGY.
APPLICATION FILED APR. 2, 1917.
1,301,640.
Patented Apr. 22, 1919.
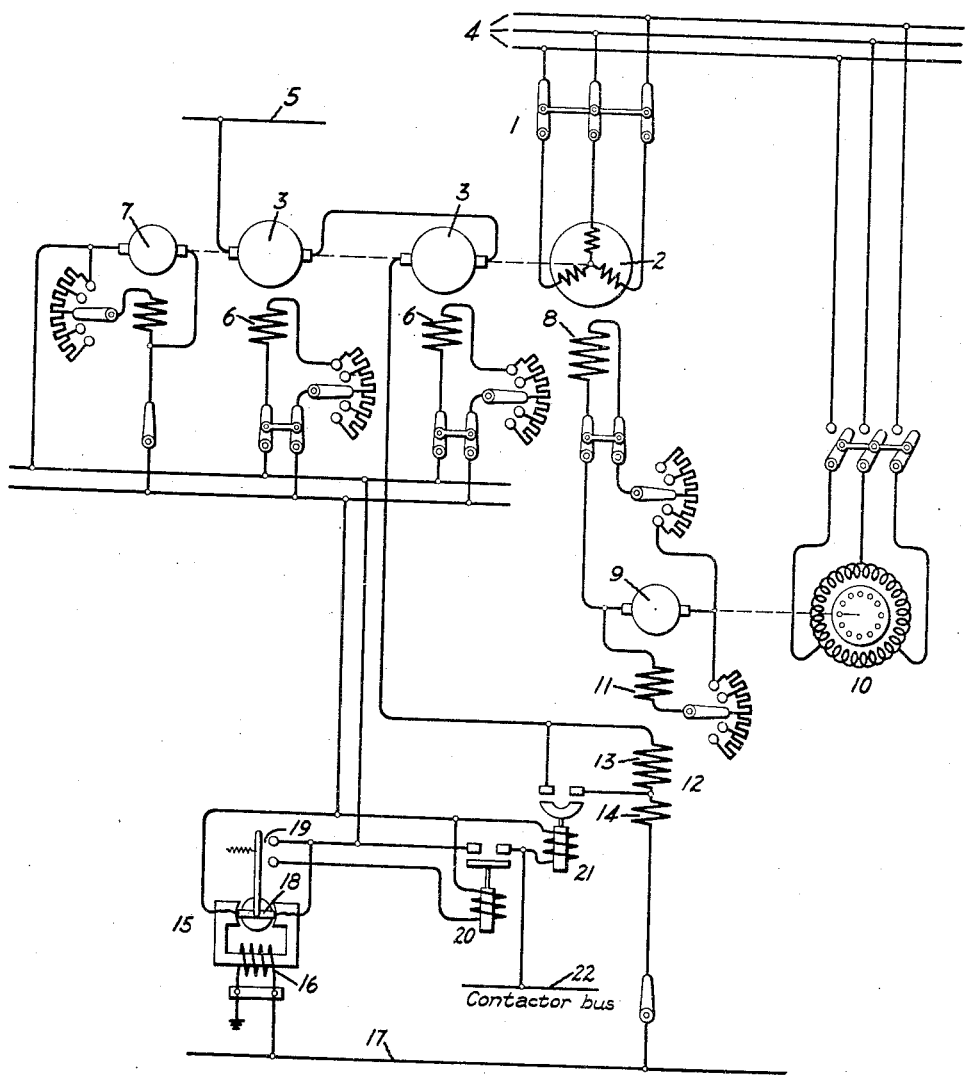
Inventor:
David Basch,
by [signature]
His Attorney.

UNITED STATES PATENT OFFICE.

DAVID BASCH, OF SCHENECTADY, NEW YORK, ASSIGNOR TO GENERAL ELECTRIC COMPANY, A CORPORATION OF NEW YORK.

SYSTEM FOR THE TRANSFORMATION OF ELECTRICAL ENERGY.

1,301,640.      Specification of Letters Patent.      Patented Apr. 22, 1919.

Application filed April 2, 1917. Serial No. 159,264.

*To all whom it may concern:*

Be it known that I, DAVID BASCH, a citizen of the United States, residing at Schenectady, in the county of Schenectady, State of New York, have invented certain new and useful Improvements in Systems for the Transformation of Electrical Energy, of which the following is a specification.

My invention relates to a system for transforming alternating current energy into direct current energy or vice versa, and particularly to a system comprising an alternating current circuit, a direct current circuit and a rotary transformer, electrically interposed therebetween and adapted to effect a transfer of electrical energy from one of said circuits to the other.

The use of a rotary transformer, comprising a synchronous motor connected to a direct current generator, for the transformation of alternating current energy into direct current energy is well known, and it has been proposed to provide means for automatically varying the excitation of the field of the synchronous motor in accordance with variations in the current delivered by the direct current generator. One way in which this has been accomplished is to supply the exciting current for the motor field from an exciter, which is provided with an auxiliary field winding so connected with respect to the direct current load circuit that the current in said winding varies with the current supplied to said circuit. This arrangement, however, presents difficulties when, due to the regenerating operation of the electrical apparatus connected to the direct current load circuit, the transformer is required to transfer energy from the said load circuit to the alternating current circuit since, in the latter event, the current in said auxiliary field winding, and hence the direction of the magnetomotive force developed thereby, is reversed.

One object of my invention, therefore, is to devise a system of the kind above referred to, in which the magnetomotive force, developed by the auxiliary field winding of the exciter which supplies direct current to the field of the synchronous motor, will be proportional to the power current traversing the direct current generator and will have the same direction regardless of the direction of flow of said current, and in which said magnetomotive force may be made to bear the same, or a different, ratio to the said current for the different directions of flow thereof. More broadly stated, however, my invention has for its object the provision of means whereby the cumulative effect of a compound winding may be automatically maintained regardless of the direction of current flow therein.

My invention will be more readily understood by reference to the drawing, the single figure of which is a diagrammatic view illustrating one form of my invention as embodied in a system including a motor generator set which comprises a synchronous motor and a pair of direct current generators connected thereto.

Referring to said figure, a motor generator set 1, comprising a synchronous motor 2 and a pair of direct current generators 3, is shown as electrically connected between a polyphase supply circuit 4 and a direct current load, or feeder circuit 5. The direct current generators are provided with field windings 6 adapted to be supplied with direct current from the exciter 7, which may, if desired, be coupled to the motor generator set. The synchronous motor 2 is provided with a field winding 8 adapted to be supplied with direct current from the exciter 9 which may be driven in any desired manner, but according to the drawing is adapted to be driven by an alternating current motor 10, to which it is directly connected. The exciter 9 is provided with a shunt field winding 11 and an auxiliary field winding 12. The winding 12 is composed of oppositely wound portions 13 and 14, of which winding portion 13 is the greater. The winding 12 is so related to the circuit, in which the armatures of the generators 3 are serially connected, that the current traversing said winding is proportional to the current in said circuit. In the drawing the winding 12 is shown as inserted directly in said circuit.

A reverse current relay 15, having a stationary winding 16, which, according to the drawing, is connected across a shunt inserted between the negative bus 17, to which one terminal of the winding 12 is connected, and ground, and a movable voltage winding 18 which is energized from the exciter 7, is provided to control, by means of the switch 19, and the relay switches 20 and 21, a short circuit about the winding portion 13. The winding of the relay switch 21 is connected to the contactor bus 22, to which similar relay switches, if there be multiple units in the station, may be connected thereby placing all of such relay switches under the control of the single reverse current relay 14.

The operation of my invention, as at present understood, is as follows: Assume the synchronous motor 2 to be operating and the generators 3 to be delivering current to the feeder 5. The direction of the current in winding 16 of the reverse current relay 15 will then bear such a relation, with respect to the current in winding 18, that the switch 19 and hence the relay switches 20 and 21 will be open and the winding portion 13 will be effective. The resultant magneto-motive force of the winding portions 13 and 14 will then be in the same direction as the magnetomotive force of the shunt winding 11 since the magnetomotive force of winding portion 13 which predominates will be in the same direction as that of winding 11. As the generator load increases the resultant magnetomotive force of winding portions 13 and 14 will increase in proportion, and hence the voltage of the exciter 9 and the excitation of the synchronous motor field 8 will likewise be increased.

Assume now that current flows from the feeder 5 to the generators 3 to drive the same as motors, which, in turn, drive the synchronous machine 2 as a generator to supply current to the alternating current circuit 4. The reversal of the flow of current through the generator 3 will result in a reversal of the flow of current in the winding 16 of the reverse current relay 15 and hence the movable winding 18, the direction of current in which remains the same, will be caused to move to close the switch 19 and, through the consequent operation of relay switches 20 and 21, to effect a short-circuiting of the winding portion 13. The winding portion 14 alone will then be effective and the magnetomotive force thereof will have the same direction as the magnetomotive force of winding 11. The magnetomotive force of winding 14 will increase as the current therethrough increases, and hence the voltage of the exciter 9 and the excitation of the winding 8 will likewise increase.

I conceive that various modifications of my invention may be made and I accordingly do not desire to be limited to the exact arrangement shown, but seek to cover, in the appended claims all such modifications, arrangements and applications of my invention as fall within the scope and spirit of my invention.

What I claim as new and desire to secure by Letters Patent of the United States, is:—

1. The combination with an alternating current circuit and a direct current circuit, each of which constitutes under certain conditions a source of electrical power supply for the other, of a motor generator set, comprising a synchronous motor and a direct current dynamo-electric machine adapted to operate either as a generator or a motor, interposed therebetween and adapted to transfer power from one circuit to the other, an exciter for said synchronous motor provided with a field winding comprising two unequal oppositely wound portions and adapted to be traversed by power current traversing said dynamo-electric machine, and means for closing a short-circuit about the greater of said portions when the power current traverses said dynamo-electric machine in a direction corresponding to the motoring operation thereof and for opening said short-circuit when the power current traverses said dynamo-electric machine in a direction corresponding to the generating operation thereof.

2. The combination with an alternating current circuit and a direct current circuit, each of which constitutes under certain conditions a source of electrical power supply for the other, of a motor generator set, comprising a synchronous motor and a direct current dynamo-electric machine adapted to operate either as a generator or a motor, interposed therebetween and adapted to transfer power from one circuit to the other, an exciter for said synchronous motor provided with a field winding comprising two oppositely wound portions and adapted to be traversed by power current traversing the said dynamo-electric machine, and means for closing a short-circuit about one of said portions when the power current traverses said dynamo-electric machine in a direction corresponding to the motoring operation thereof, and for opening said short-circuit when the power current traverses said dynamo-electric machine in a direction corresponding to the generating operation thereof.

3. The combination with an alternating current circuit and a direct current circuit, of a motor generator set, comprising a synchronous motor and a direct current dynamo-electric machine, interposed therebetween and adapted to transfer power from either circuit to the other, an exciter for said synchronous motor adapted to be compounded by the power current traversing said dynamo-electric machine, and means controlled by said power current for maintaining the direction of the magnetomotive force produced in said exciter by said power current the same regardless of the direction of flow of said power current.

4. The combination with an alternating current circuit and a direct current circuit, each of which constitutes under certain conditions a source of electrical power supply for the other, of a rotary transformer provided with a field winding and adapted to transfer electrical power from one circuit to the other, an exciter for supplying current to said field winding adapted to be compounded by the power current in one of the circuits, and means controlled by said power current for maintaining the direction of the magnetomotive force produced in said exciter by said power current the same regardless of the direction of flow of said power current.

5. The combination with a dynamo-electric machine adapted to operate as a generator or as a motor, depending upon the direction of flow of the power current therethrough, of a second dynamo-electric machine adapted to be compounded by the power current traversing the first named dynamo-electric machine, means controlled by said power current for maintaining the direction of compounding in said second dynamo-electric machine unchanged when the direction of flow of the power current changes.

6. The combination with a dynamo-electric machine having a field winding comprising a plurality of unequal oppositely wound portions and adapted to be traversed by a current, the direction of flow of which is subjected to reversal, of means for controlling the portions of said winding to be traversed by said current to maintain the direction of the magnetomotive force of said winding the same regardless of the direction of flow of said current.

7. The combination with a dynamo-electric machine having a field winding comprising two unequal oppositely wound portions and adapted to be traversed by a current, the direction of flow of which is subjected to reversal, of means for closing a short circuit about the greater of said portions when said current flows in one direction and for opening said short circuit when the current flows in the opposite direction.

In witness whereof, I have hereunto set my hand this 31st day of March 1917.

DAVID BASCH.